United States Patent
Jaffe

(10) Patent No.: US 12,056,630 B1
(45) Date of Patent: Aug. 6, 2024

(54) RESERVATION MODIFICATION SYSTEM USING MACHINE-LEARNING ANALYSIS

(71) Applicant: Private Negotiator LLC, Walnut Creek, CA (US)

(72) Inventor: Howard Jaffe, Walnut Creek, CA (US)

(*) Notice: Subject to any disclaimer, the term of this patent is extended or adjusted under 35 U.S.C. 154(b) by 0 days.

(21) Appl. No.: 18/123,267

(22) Filed: Mar. 18, 2023

(51) Int. Cl.
*G06Q 10/00* (2023.01)
*G06N 20/00* (2019.01)
*G06Q 10/02* (2012.01)
*G06F 3/0484* (2022.01)

(52) U.S. Cl.
CPC ............ *G06Q 10/02* (2013.01); *G06N 20/00* (2019.01); *G06F 3/0484* (2013.01)

(58) Field of Classification Search
None
See application file for complete search history.

(56) References Cited

U.S. PATENT DOCUMENTS

| | | | |
|---|---|---|---|
| 5,948,040 A | 9/1999 | DeLorme et al. | |
| 9,418,345 B1 | 8/2016 | Meehan et al. | |
| 2002/0111935 A1 | 8/2002 | Jones et al. | |
| 2005/0203782 A1 | 9/2005 | Smith | |
| 2006/0277078 A1 | 12/2006 | Ohmori et al. | |
| 2009/0171700 A1 | 7/2009 | Osullivan et al. | |
| 2010/0191551 A1 | 7/2010 | Drance et al. | |
| 2010/0228577 A1* | 9/2010 | Cunningham | G06Q 10/02 715/764 |
| 2011/0015954 A1 | 1/2011 | Ward | |
| 2012/0246081 A1* | 9/2012 | Brown | G06Q 10/10 705/304 |
| 2013/0144660 A1 | 6/2013 | Martin | |
| 2014/0268184 A1* | 9/2014 | Mittal | G06F 40/103 715/202 |
| 2015/0066546 A1* | 3/2015 | Scarborough | G06Q 10/02 705/5 |
| 2015/0154669 A1 | 6/2015 | Wu et al. | |
| 2015/0213377 A1 | 7/2015 | Ito et al. | |
| 2015/0220966 A1 | 8/2015 | Piana et al. | |
| 2015/0302301 A1* | 10/2015 | Petersen | G06Q 10/107 706/11 |
| 2016/0283869 A1* | 9/2016 | Williams | G06Q 10/02 |

(Continued)

*Primary Examiner* — Tonya Joseph
(74) *Attorney, Agent, or Firm* — Schwegman Lundberg & Woessner, P.A.

(57) ABSTRACT

Systems and methods are directed to managing reservation modifications using machine-learning analysis. The system trains a modification probability model to determine probabilities for modification option acceptance. The system performs machine learning analysis by applying attributes associated with an item to the modification probability model to generate modification recommendations. Modification options are established for the item based on the modification recommendations. Subsequently, in response to a modification request from a customer, a modification user interface is provided to the customer using the modification options. The modification user interface includes blocked off time periods that cannot be selected and available time periods for modification along with a fee associated with each available time period. If an alternative start time or end time (e.g., an available time period) is selected, the system processes the selection and provides a confirmation to the customer.

18 Claims, 10 Drawing Sheets

(56) References Cited

U.S. PATENT DOCUMENTS

| | | |
|---|---|---|
| 2017/0026318 A1* | 1/2017 | Daniel ................. H04L 51/046 |
| 2017/0180276 A1* | 6/2017 | Gershony ............. H04L 51/222 |
| 2017/0206471 A1 | 7/2017 | Dermosessian |
| 2017/0213161 A1 | 7/2017 | Moati et al. |
| 2017/0364836 A1 | 12/2017 | Li |
| 2018/0068236 A1 | 3/2018 | Lalvani et al. |
| 2019/0102670 A1* | 4/2019 | Ceulemans ......... G06F 21/6218 |
| 2020/0134514 A1 | 4/2020 | Ditomaso et al. |
| 2022/0237525 A1 | 7/2022 | Jaffe |

* cited by examiner

| ATTRIBUTE | VALUE | CONFIDENCE |
|---|---|---|
| COST/NIGHT | $250 | 78% |
| DISTANCE | 5 MILES | 85% |
| SQ FOOTAGE | 1500 | 85% |
| # BEDROOMS | 5 | 20% |
| # BATHROOMS | 1 | 99% |
| # PEOPLE | 2 | 99% |

| 1HR | 2HR | 3HR | 4HR | 5HR | 6HR | 7HR | 8HR |
|---|---|---|---|---|---|---|---|
| $1 | $1 | $2 | $2 | $3 | $3 | $4 | $5 |
| $2 | $2 | $4 | $4 | $6 | $6 | $8 | $10 |
| $3 | $3 | $6 | $6 | $9 | $9 | $12 | $15 |
| $4 | $4 | $8 | $8 | $12 | $12 | $16 | $20 |
| $5 | $5 | $10 | $10 | $15 | $15 | $20 | $25 |
| $6 | $6 | $12 | $12 | $18 | $18 | $24 | $30 |
| $7 | $7 | $14 | $14 | $21 | $21 | $28 | $35 |
| $8 | $8 | $16 | $16 | $24 | $24 | $32 | $40 |
| $9 | $9 | $18 | $18 | $27 | $27 | $36 | $45 |
| $10 | $10 | $20 | $20 | $30 | $30 | $40 | $50 |
| $11 | $11 | $22 | $22 | $33 | $33 | $44 | $55 |
| $12 | $12 | $24 | $24 | $36 | $36 | $48 | $60 |
| $13 | $13 | $26 | $26 | $39 | $39 | $52 | $65 |
| $14 | $14 | $28 | $28 | $42 | $42 | $56 | $70 |
| $15 | $15 | $30 | $30 | $45 | $45 | $60 | $75 |

[UPDATE RECOMMENDATION]

FIG. 4

RESERVATION MODIFICATION SYSTEM USING MACHINE-LEARNING ANALYSIS

TECHNICAL FIELD

The subject matter disclosed herein generally relates to reservation systems. Specifically, the present disclosure addresses systems and methods for managing reservation modifications using machine-learning analysis.

BACKGROUND

Existing systems allow a user to reserve an item for rent for a period of time. However, once the item has been reserved and the user and an agent for the item have received confirmation of the reservation, the existing systems do not allow the customer to see a full range of possible start and/or end time adjustments to the rental period without first contacting the agent to review and discuss a request to adjust the rental period. As such, existing systems require active engagement from the agent to modify a start and/or end time or even determine if the adjustment is available. Thus, existing systems disrupt the agent, and the user is often delayed in getting a response. Further still, the response rarely expresses the full range of possible start and/or end time adjustments that are allowed.

For example, companies like Airbnb, Inc. may have over a million guest check-in/checkout events per day and approximately 15-20% of guests request an early check in and/or a late checkout. When an agent (e.g., property owner) receives such a request, they have to respond to the request while considering other factors such as, for example, whether the property has been cleaned yet. The agent then has to communicate when the earliest time would be for check-in or when a latest time is for checkout. Finally, the agent may need to request payment for the early check-in or late checkout through some means.

BRIEF DESCRIPTION OF THE DRAWINGS

Some embodiments are illustrated by way of example and not limitation in the figures of the accompanying drawings.

FIG. 4 is an example pricing success matrix generated by the machine-learning model, according to some example embodiments.

DETAILED DESCRIPTION

Figure 1:
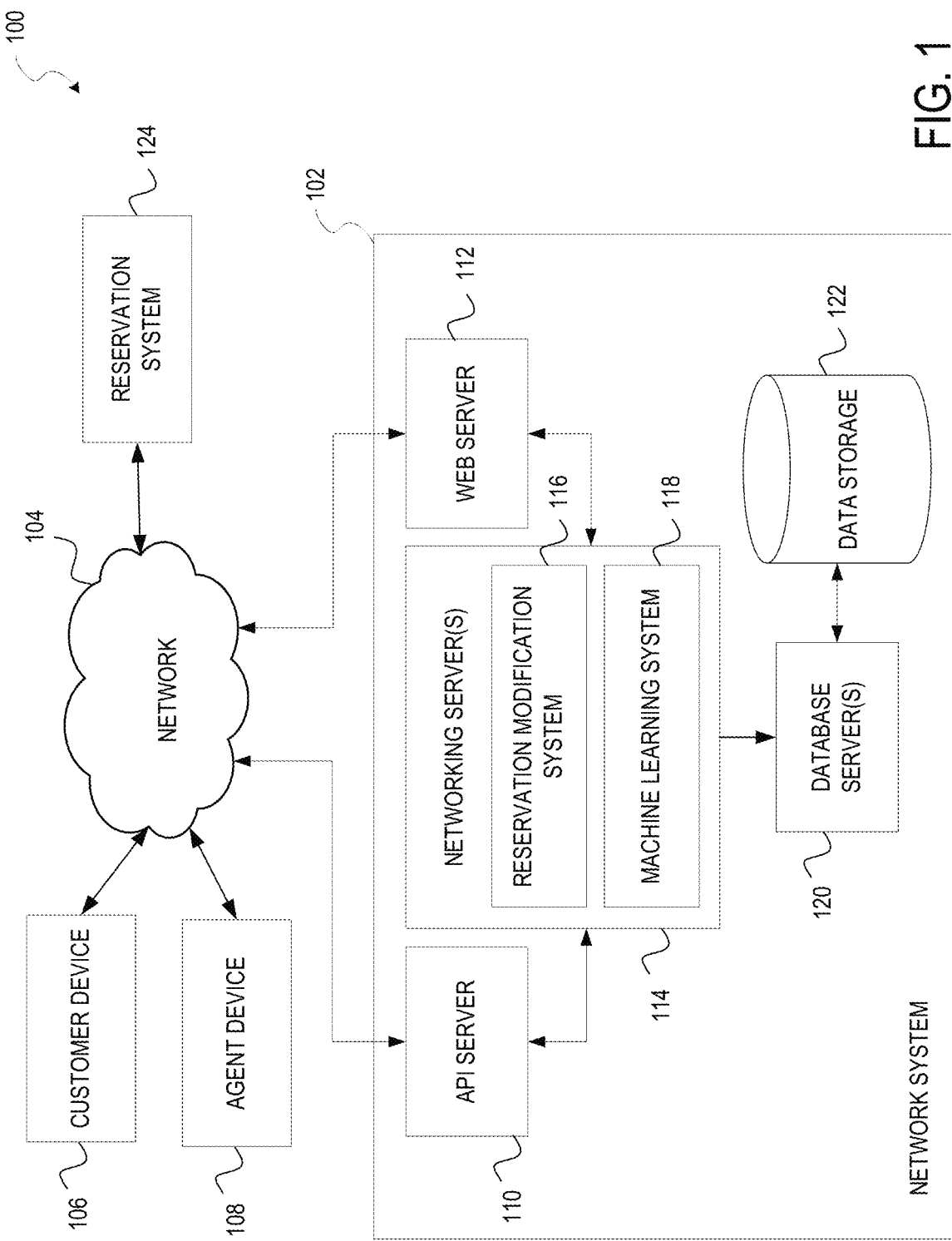
FIG. 1 is a diagram illustrating a network environment suitable for reservation modification using machine-learning analysis, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Systems and methods that machine-train (e.g., using machine-learning) a modification probability model that forecasts or predicts rental modification option acceptance and apply the modification probability model to specific items for selected dates are discussed herein. A highest machine-learning-derived fee in a set of fees that transgresses a fee threshold is selected for each time period. These fees are then used to populate an agent user interface, in which the agent can make adjustments and/or approve the modification options. The modification probability model is periodically retrained with updated transaction information. At a frequency set by the agent, the revised modification probability model is used to reevaluate the fees. In some embodiments where autopilot mode is engaged or activated, the revised fees are used to automatically update (without agent interaction) modification options that are made available to a customer. In other embodiments, an alert regarding the revised fees can be transmitted to the agent.

The machine training of the modification probability model involves training on data from past transactions involving rental modifications and whether various modification options were accepted or rejected. Because transactions are continually occurring, new transactions can be used to retrain/refine the modification probability model. Thus, the modification probability model can be continuously refined and improved (e.g., on a daily or weekly basis) to account for ongoing trends.

Example embodiments address the technical problem of determining machine-learning-derived modification options and automatically incorporating the modification options in a customer modification user interface. The technical solution predicts, using a machine-trained modification probability model, probabilities for modification options for different items on different dates (or groups of dates). Based on the probabilities, the system can recommend fees to apply to different time periods for an item. These recommended fees are used to generate the customer modification user interface that is displayed to a customer. The customer can interact with the modification user interface instead of having to trade countless communications with an agent of the item the customer is renting. Additionally, the agent does not need to painstakingly research modification options for their items or identify upcoming seasonality trends, price changes, and demands. As a result, one or more of the methodologies described herein may obviate a need for certain efforts or computing resources that otherwise would be involved in performing research by the agent and transmitting numerous communications per rental modification. Examples of such computing resources include processor cycles, network traffic, memory usage, data storage capacity, power consumption, network bandwidth, and cooling capacity.

FIG. 1 is a diagram illustrating a network environment 100 suitable for reservation modification using machine-learning analysis, in accordance with example embodiments. A network system 102 provides server-side functionality via a communication network 104 (e.g., the Internet, wireless network, cellular network, or a Wide Area Network (WAN)) to a customer device 106 and an agent device 108. In example embodiments, the network system 102 machine-trains a modification probability model using transaction histories and, during runtime or application time, applies the modification probability model to items for rent managed by an agent, as will be discussed in more detail below.

In various cases, the customer device 106 is a device associated with a user that is renting an item, while the agent device 108 is a device associated with the agent that is managing the item for rent. In some cases, the item for rent is real estate (e.g., a bedroom, a house, a condo, an office space). In other cases, the item for rent can be a piece of equipment (e.g., a car, a boat, a moving van) or a service (e.g., catering service). The agent can be the owner, consignee, or custodian of the item for rent or otherwise managing the item for rent.

The customer device 106 and the agent device 108 interface with the network system 102 via a connection with the network 104. Depending on the form of the client device 106 and seller device 108, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks.

In another example, the connection to the network 104 is a Wireless Fidelity (Wi-Fi, IEEE 802.11x type) connection, a Worldwide Interoperability for Microwave Access (WiMAX) connection, or another type of wireless data connection. In such an example, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

The customer device 106 and the agent device 108 may comprise, but are not limited to, a smartphone, tablet, laptop, multi-processor systems, microprocessor-based or programmable consumer electronics, game consoles, set-top boxes, a server, or any other communication device that can access the network system 102. The customer device 106 and agent device 108 may comprise a display module (not shown) to display information (e.g., in the form of user interfaces). The customer device 106 and/or the agent device 108 can be operated by a human user and/or a machine user.

Turning specifically to the network system 102, an application programing interface (API) server 110 and a web server 112 are coupled to, and provide programmatic and web interfaces respectively to, one or more networking servers 114. In example embodiments, the networking server(s) 114 host a reservation modification system 116 and a machine learning system 118, each of which comprises a plurality of components and each of which can be embodied as hardware, software, firmware, or any combination thereof. The reservation modification system 116 is configured to manage reservation modifications and will be discussed in more detail in connection with FIG. 2. The machine learning system 118 is configured to train/retrain a modification probability model and use the modification probability model in generating customized modification recommendations and options. The machine learning system 118 will be discussed in more detail in connection with FIG. 3.

The networking servers 114 are, in turn, coupled to one or more database servers or engines 120 that facilitate access to one or more storage repositories or data storage 122. Each data storage 122 is a storage device storing one or more databases. For example, the databases can include a customer database, an agent database, an item database, and a transaction database. Additionally or alternatively, the data storage 122 is a storage device that can store the modification probability model and the modification options derived for the items.

In some embodiments, the customer database includes data related to customers who have registered to use the network system 102. In these embodiments, the customer database can include usernames, login information, customer profile information, as well as any other information supplied by a customer, such as payment methods for paying for the modification of a rental period (e.g., start datetime, end datetime) for one or more items that the customer has reserved for rental. As used herein, the term "datetime" refers to a specific time of a specific day. For example, 10:00 AM on March 17 is a specific time on a specific date. This term is more specific that the term "time" which refers to any day. For example, 10:00 AM occurs every day.

In some embodiments, the agent database includes data related to agents who have registered for a service provided by the network system 102. In these embodiments, the agent database can include usernames, login information, agent profile information, agent property or service information, and/or agent settings and preferences with respect to start and end dates and time for items they offer for rent. Because the network system 102 allows an agent to set different start and end times for any number of days, weeks, and/or months in each year, the agent database further stores default settings provided by the agent. For example, the agent can input each item offered for rent and one or more (standard and/or default) start and end times. The agent can also register with the network system 102 to offer alternative rental start and/or end datetimes for a particular rental period (e.g., January 1-14), for one or more specific days (e.g., each Monday or holiday), or for groups of days (e.g., weekdays, weekends).

In some embodiments, the item database contains data related to items for rent that are associated with the agents. For example, if the item is real property offered for rent as lodging or office space, then the information may include a description of the property (e.g., photos, text), a location of the property, and standard rental start/end times, default rental start/end datetimes, and/or alternative rental start/end datetimes for specific days or groups of days. If the item is non-real property (e.g., tool, equipment, vehicle), then the information may include a description of the item (e.g., photo, text), one or more locations where the item can be retrieved and/or returned, standard rental start/end times, default rental start/end datetimes, and/or alternative rental start/end datetimes for a specific day or group of days. If the item is a service, the data can include a description of the service (e.g., photos, text), a region where the service is offered (e.g., catering service offered only within city limits), standard rental start/end times, default rental start/end datetimes, and/or alternative rental start/end datetimes for a specific day or group of days. In cases where the service is an online service, such as an educational class, a tutoring service, a software as a service (SaaS), the information may include standard rental start/end times, default rental start/end datetimes, and/or alternative rental start/end datetimes for a specific day or group of days.

In some embodiments, the transaction database includes data related to transactions carried out through the network system 102. In some cases, the data is information related to past, present, or future rentals including modifications to the rental start or end datetimes. In some cases, the data includes communications between a customer and an agent generated as a result of a transaction carried out through the network system 102. The data can also include information associated with payment of one or more fees for a specific modified rental start or end datetime. Such payment data can be organized and retrieved in a manner that is useful for accounting, auditing, trends, averages, or any other purpose.

The reservation system 124 comprises a system that manages the rental of items. In some embodiments, the network system 102 and the reservation system 124 are the same system (e.g., the reservation system 124 is a part of the network system 102 or vice-versa). In other embodiments, the reservation system 124 may be a primary system that manages the rental of the item (e.g., Airbnb, Vrbo) and the network system 102 is a separate (e.g., third-party or stand-alone) service that interacts with the reservation system 124 to manage modifications to reservations initially made via the reservation system 124. In these embodiments, the network system 102 can use the data in the customer database and agent database (e.g., username, logins) to access (e.g., login and retrieve) reservation information at the reservation system 124 in order to manage and modify reservations. In these cases, some of the data indicated as being stored in the data storage 122 may, instead, be accessed from data storage at the reservation system 124 (e.g., item data).

Any of the systems, servers, data storage, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 10, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Functionalities of one system may, in alternative examples, be embodied in a different system. For example, some functionalities of the reservation modification system 116 may be embodied in the machine learning system 118 and/or vice-versa. Additionally, any number of customer devices 106, agent devices 108, or data storage 122 may be embodied within the network environment 100. While only a single network system 102 is shown, alternatively, more than one network system 102 can be included (e.g., localized to a particular region).

Figure 2:
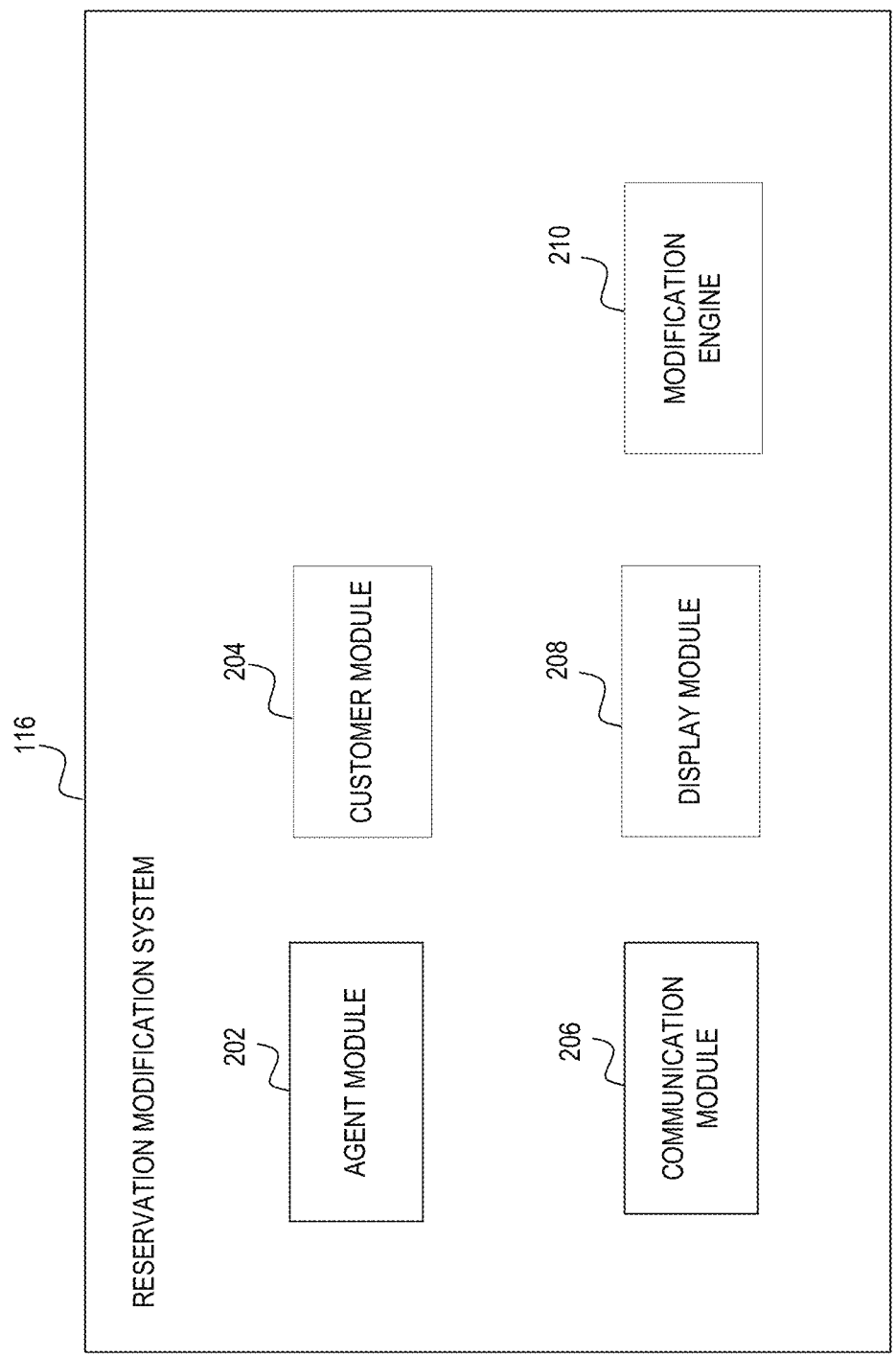
FIG. 2 is a diagram illustrating components of a reservation modification system, according to some example embodiments.

FIG. 2 is a diagram illustrating components of the reservation modification system 116, according to some example embodiments. The reservation modification system 116 is configured to manage modifications of reservations for items. To enable these operations, the reservation modification system 116 comprises an agent module 202, a customer module 204, a communication module 206, a display module 208, and a modification engine 210 all of which are communicatively coupled.

In example embodiments, the agent module 202 is configured to manage agent interactions with the network system 102. For example, the agent module 202 can facilitate deployment (e.g., causes presentation) of agent user interfaces (e.g., generated by the display module 208) on the agent device 108 for interacting with the network system 102. The agent module 202 also facilitates registration of the agent with the network system 102 along with receiving reservation and modification settings (e.g., thresholds). For instance, the agent can create, via the agent module 202, an account with the network system 102 and identify one or more items that are available for rent that may have alternative rental start datetime and/or end datetimes. The agent can also indicate inputs regarding options available for modification for each item. These options can include whether rental start datetime, rental end datetime, or both datetimes can be modified. Thus, the agent module 202 can obtain and store standard rental start and end times, default rental start and end datetimes, and/or one or more alternative rental start and end times (or datetimes) for all days of the year, for a specific day, or for a group of days. Additionally, the agent can set, via the agent module 202, a frequency at which a machine learning analysis is performed to update modification recommendations/options and can set a minimum and/or a maximum price for each reservation time period, which can be used in an autopilot mode to automatically adjust a corresponding modification option (e.g., a fee charged for making the modification), as will be discussed in more detail below.

In example embodiments, the customer module 204 is configured to manage customer interactions with the network system 102. For example, the customer module 204 can facilitate deployment (e.g., cause presentation) of customer user interfaces (e.g., generated by the display module 208) on the customer device 106 for interacting with the network system 102. The customer module 204 also facilitates registration/login of the customer having an existing reservation. For instance, the customer can create, via the customer module 204, an account with the network system 102 and provide information regarding one or more reservations for items. For example, the customer can indicate a confirmation number, agent information, or property information. The customer can also provide inputs (e.g., selections) regarding modifying a rental start datetime, a rental end datetime, or both. In some cases, payment of a fee may be required for a selected modification. As such, the customer can provide, via the customer module 204, payment information (e.g., credit card number, banking account information) which may be stored to their account (e.g., in the customer database).

The communication module 206 is configured to manage communications between the network system 102 and other components of the network environment 100. In embodiments where the network system 102 is a third-party system or stand-alone system, the communication module 206 is in communication with the reservation system 124 to access reservation information stored at the reservation system 124 for a customer or agent. In some embodiments, the communication module 206 is in communication with an external payment system to process a payment for a rental modification. For example, the payment system can include a banking computer system or other payment service system(s) (e.g., PayPal, Square). The other payment service systems can, for example, process payments utilizing credit cards.

The display module 208 is configured to generate and cause display of user interfaces to agents, customers, and/or administrators. In some embodiments, the display module 208 is configured to temporarily generate and cause display of various pieces of information in response to one or more commands or operations. The various pieces of information or data generated and caused to be display may be transiently generated and displayed, and the displayed content may be refreshed and replaced, by the display module 208, with different content upon receipt of different commands or operations.

The modification engine 210 is configured to manage the modification process at the network system 102. In example embodiments, the modification engine 210 receives a modification request from the customer and processes the modification request. The modification engine 210 accesses, based on the modification request, available modification options and parameters derived by the machine learning system 118 and approved by the agent of the item associated with the modification request. The modification engine 210 then triggers the display module 208 to generate a customer modification user interface that displays the modification options to the customer. Upon a selection of a modification option, the modification engine 210 can trigger processing of a fee, if one is required, and provides a notification to the agent and a confirmation to the customer regarding the rental modification.

Figure 3:
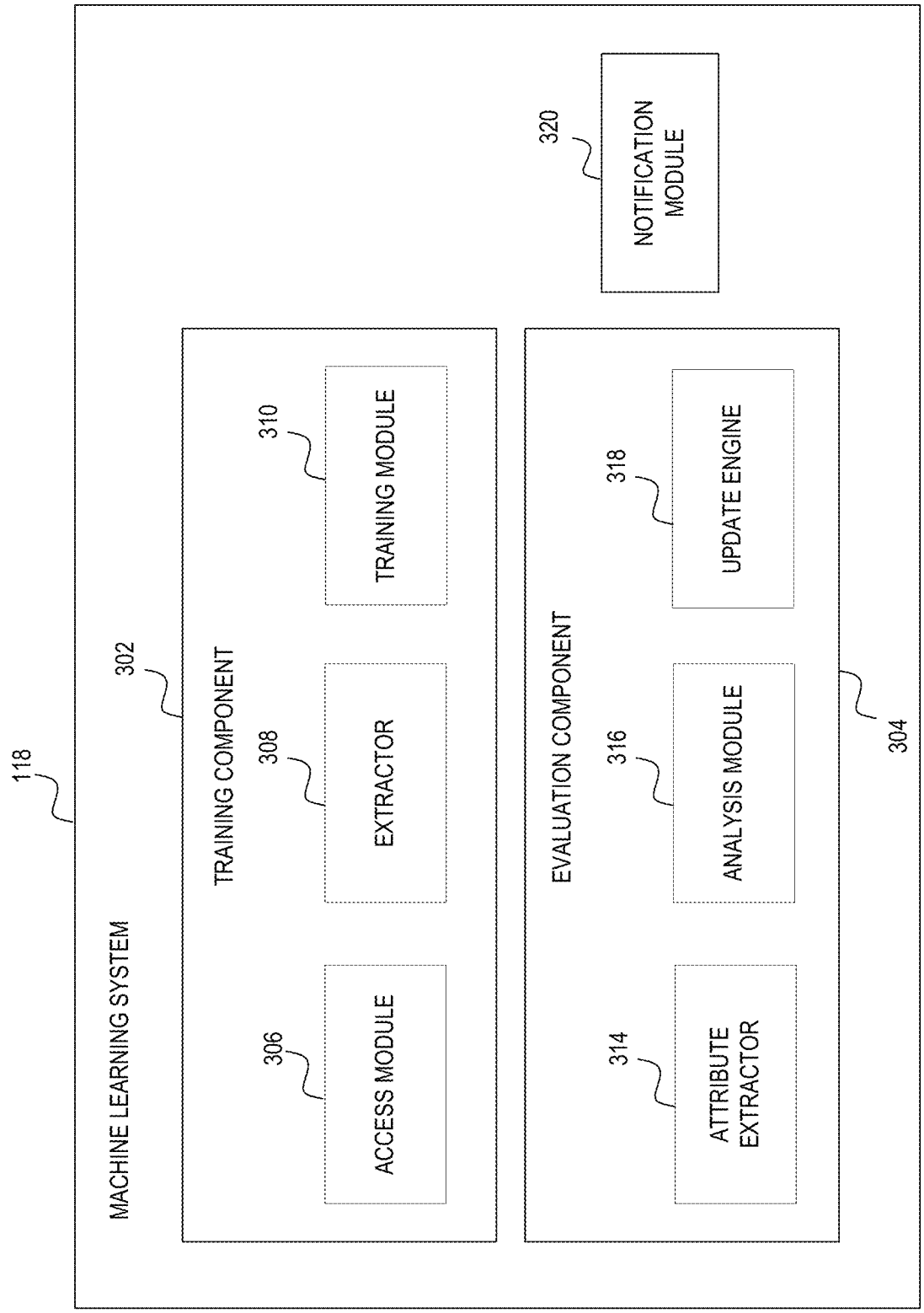
FIG. 3 is a diagram illustrating components of a machine learning system, according to some example embodiments.

FIG. 3 is a diagram illustrating components of the machine learning system 118, according to some example embodiments. The machine learning system 118 is configured to train a machine learning probability model and use the probability model to generate modification recommendations (including parameters) that are customized to each specific rental item for specific days (or groups of days). To enable these operations, the machine learning system 118 comprises a training component 302, an evaluation component 304, and a notification module 320 all configured to communicate with each other (e.g., via a bus, shared memory, or a switch). While FIG. 3 shows the training component 302 and the evaluation component 304 being embodied within the machine learning system 118, alternatively, the training component 302 can be separate from the evaluation component 304 in a different system or server. For example, the evaluation component 304 may be a part of the reservation modification system 116.

In example embodiments, the training component 302 trains a modification probability model using training data derived from past transactions. For example, the past transactions can include rental modifications that occurred via the network system 102 (e.g., facilitated by the reservation modification system 116) include modification options that were accepted and rejected. The machine learning can occur using linear regression, logistic regression, a decision tree, an artificial neural network, k-nearest neighbors, and/or k-means, to name a few examples. The training component 302 can comprise an access module 306, an extractor 308, and a training module 310.

The access module 306 accesses a data storage (e.g., data storage 122) that stores past transactions involving rental item modifications. The access module 306 may identify and group past transactions, for example, based on item categories (e.g., house, vehicles, equipment), locations of items, and/or time frames. The access module 306 can thus select the types or groups of past transactions used to train the modification probability model. As such, the access module 306 can operate as a filter to select the past transactions from which features will be extracted to train the modification probability model (e.g., for a specific location, specific category, specific range of prices). For example, past transactions can be grouped by location to generate regional modification probability models (e.g., for different cities or neighborhoods). The filtering/grouping of the past transactions, and thus training data extracted therefrom, can result in a model that is more accurate and requires fewer computing resources and/or increased processing speed. In some cases, the access module 306 does not filter the past transactions but merely uses all past transactions in a particular time frame (e.g., the past year).

The extractor 308 is configured to extract training data from the past transactions. For example, the extractor 308 extracts item attributes (e.g., rental prices, location, square footage, number of bedrooms, number of bathrooms, number of people) and modification attributes (e.g., number of hours for early check-in, number of hours for late checkout, fee paid for early check-in and/or late checkout, previous modification options accepted/declined, dates of the rental modifications). Hereto, the extracted data can be filtered and/or grouped based on one or item attributes (e.g., location, category, range of prices; dates, size, capacity, number of rooms), which can result in a model that requires fewer computing resources and/or increased processing speed. The extracted data is then passed to the training module 310.

The training module 310 trains the modification probability model using, for example, neural networks or classical machine learning. The training data used for training includes the item attributes and the modification attributes from the past transactions in any combination. The training of the modification probability model may include training for probabilities (e.g., thresholds and/or ranges) of whether a user will accept a modification option that is based on a combination of time and cost. That is, the modification probability model is trained to predict a likelihood a user will accept a modification option for a given set of item attributes and/or a given timeframe (e.g., group of dates). The machine training can occur using, for example, linear regression, logistic regression, a decision tree, an artificial neural network, k-nearest neighbors, and/or k-means. In some embodiments, different weights can be applied to different attributes by the training module 310. For instance, location and pricing may be weighted higher while square footage is weighted lower. The weights can be system derived or adjusted by an agent or an administrator.

The modification probability model is periodically (e.g., daily, weekly) retrained. Accordingly, new completed transactions can be used to retrain/refine the modification probability model. Extracted training data from these newer transactions in combination with some or all of the previous training data (the combination of which can be filtered/grouped) comprises an updated training set that trains a more robust modification probability model that provides more accurate probabilities and captures changing trends, which improves the accuracy, efficiency, and performance of the network system 102.

During runtime or application time, the evaluation component 304 of the machine learning system 118 is configured to generate a pricing success matrix based on attributes associated with a rental item that an agent wants to establish/maintain modification options for. To perform these operations, the evaluation component 304 comprises an attribute extractor 314, an analysis module 316, and an update engine 318.

During runtime or application time, the agent indicates an item (also referred to as "item of interest") that the agent wants to establish/maintain modification options for via, for example, an agent user interface. The agent may indicate, for example, the item along with particular dates that the modification options would apply to. The attribute extractor 314 then accesses data associated with the agent and the item to determine item attributes and agent attributes. For example, the attribute extractor 314 can access the account profile or account history (e.g., the agent database) associated with the agent and determine agent attributes including, for example, past adjustments the agent has accepted and fee minimum and maximum ranges established for the agent for the item. Similarly, the attribute extractor 314 can access listing data associated with the item (e.g., item database) and determine item attributes. For example, if the item is real estate, the item attributes can include cost of the rental per day, location, square footage, number of bedrooms, and/or number of bathrooms.

The extracted attributes are then passed to the analysis module 316 and/or the update engine 318. The analysis module 316 applies the extracted attributes to the modification probability model. In some embodiments, the analysis module 316 generates a customized pricing success matrix 400 as shown in FIG. 4. The pricing success matrix depicts using, for example, a color or shading scheme, percent of conversions for similar items (e.g., conversion probabilities) for potential modification options (e.g., time period and fee). Conversion means customers previously accepted and paid a given price (also referred to herein as "fee") for early or late check-in or checkout (or rental start-time and/or stop-time). Similar items are items that have similar attributes as those of the item of interest. In cases where the item is real-estate, the attributes include, for example, location, amenities, number of bedrooms, number of bathrooms, and/or cost per night. In some embodiments, a first pricing success matrix can be generated for early check-in (or rental start-time) and a second pricing success matrix can be generated for late checkout (or rental stop-time). In some cases, a pricing success matrix can be generated for late check-in and/or early check-out.

In the example pricing success matrix of FIG. 4, no shade (or a green color) indicates that a high probability or high percentage (e.g., 70%-100%) of customers previously seeking an early check-in accepted the corresponding pricing for various time periods (e.g., accepted the potential modification option) for a similar item. For example, a column labeled "1 HR" represents success for various fees for customers looking to check in one hour early. A medium shade (or yellow color) can indicate acceptance at 40%-69%, for example. Finally, a dark shade (or red color) can indicate acceptance at less than 40%. The method to generate the pricing success matrix for late check-in, early checkout, or late checkout parallels the method to generate the pricing success matrix for early check-in except for early/late checkout, the modification probability model is analyzing data from when customers checked out and which fees they accepted. The percentages discussed herein are merely examples and can be different and/or be changed by a user (e.g., administrator, agent).

In example embodiments, an initial pricing success matrix is generated by the analysis model 316 based on attributes most similar to the item of interest. For example, if the item is real estate located on Mission Street in San Francisco, California at a cost of $250/night with 1500 square feet, five bedrooms, and one bathroom for two people, the analysis model 316 applies those attributes to the modification probability model which will use data from properties with similar and/or nearby parameters. The modification probability model will indicate statistical confidence intervals for each attribute. A high confidence interval indicates that there is plenty of historical data with a fairly low beta (variability) such that the shade/color indications on the pricing success matrix can be more trusted. For example, at $250/night, the confidence interval is 78%. Similarly, for square footage of 1500, the confidence interval is 85%. The agent can change an attribute (e.g., price per night, distance, number of people) if the agent wants to review data based on, for example, a higher confidence interval. For instance, the agent can enter a different value for an attribute and the pricing success matrix will be updated.

Once the agent approves of the pricing success matrix, the agent can select an "update recommendation" (or similar) button/icon 402. The approval triggers the analysis module 316 to select the highest machine-learning-derived fee in a set of fees that transgresses a fee threshold for each time period. In the present example, the fee threshold is 70% (e.g., a fee from a set of fees with the highest percentage—70% to 100%) in each column. For instance, for one-hour earlier check-in, the highest fee is $7, while the highest fee for checking in three hours early is $12 in the example of FIG. 4. In other words, the analysis module 316 selects the potential modification option with the highest fee that transgresses the fee threshold for each time period.

Referring back to FIG. 3, the update engine 318 receives the potential modification options (e.g., highest fees for each time period) from the analysis module 316 and uses those options to populate an agent user interface with modification recommendations. In some cases, the agent has set (e.g., via the agent module 202) minimum and maximum fees they are willing to accept for different time periods and/or has set times that are not available for early (and/or late) check-in or late (and/or early) checkout. In some cases, the network system 102 determines the minimum and maximum fees and non-available times based on past transactions of the agent. The update engine 310 accesses these settings/thresholds (e.g., from the agent database) and uses the information when populating the agent user interface. For instance, if the fee obtained from the analysis module 316 is lower than the minimum fee set by the agent for a particular time period, then the minimum fee overrides the fee from the analysis module 316 when populating the agent user interface.

Figure 5:
FIG. 5 is an example reservation modification user interface, according to some example embodiments.

Referring now to FIG. 5, an example agent reservation modification user interface 500 is shown. The agent reservation modification user interface 500 (or "agent user interface") provides the modification recommendations in a visual format that is easy for the agent to understand and, if needed, adjust. The agent user interface 500 shows rental start times (Check In) and rental end times (Check Out). However, other configurations are contemplated including, for example, a user interface that shows only the rental start day/time options or only the rental end day/time options.

In the example agent user interface 500, the periods beginning at 1:00 PM, 2:00 PM, 3:00 PM, and 4:00 PM are designated "Free" for check-in. This indicates that the default start time for a rental beginning on that day has been defined as one of those time periods (e.g., 2:00 PM) and the other options are available to a customer for no additional fee. Similarly, 11:00 AM and 12:00 PM are "Free" for checkout. The agent user interface 500 also includes earlier start times (e.g., 9:00 AM, 10:00 AM, 11:00 AM, and 12:00 PM) and an additional start time later in the day at 5:00 PM for late check-in. These earlier start times and later start time have an associated fee that is based on the fees derived by the analysis module 216 or set by the agent. The periods beginning at 7:00 AM, 8:00 AM, and 6:00 PM are shaded to indicate that the start time cannot be modified to those time periods for check-in, and the periods of 6:00 PM, 7:00 PM, 8:00 PM, 9:00 PM, and 10:00 PM are shaded to indicate that those times cannot be chosen for late checkout. These unavailable times can be default times, based on the agent settings, or derived from past transactions of the agent.

The agent can override any of the recommendations (e.g., available/unavailable times) or parameters (e.g., fees) on the agent user interface 500. For example, the agent can block times that are not available causing them to be grayed out, mark time as free if there is no charge for that particular time, or adjust the fees. In some cases, the agent can select an open box adjacent to a fee amount for inclusion (e.g., make available) or non-inclusion (make not available) of that particular time period for modification. For instance, the agent can check the box for 9:00 AM to make that time unavailable for early check-in. In other cases, the box can be selected to change a fee amount. For example, selection of a box for 10:00 AM can trigger a display of alternative fee amounts for selection or provide a field where the amount can be entered by the agent (e.g., in a popover window). In some embodiments, the agent user interface 500 will not include the boxes adjacent to the time/fee combinations (also referred to as a "modification option"). Instead, the agent can simply select the fee that the agent wants to change (e.g., with their cursor) and enter a replacement fee amount.

In some embodiments, the agent can use the initial (e.g., first) pricing success matrix provided by the analysis module 316 and/or the initial set of modification recommendations provided by the update engine 318 to establish their default modification settings and thresholds. The default modification settings and thresholds can include a minimum fee and/or maximum fee for each time period, time periods that are free, and/or blocked off times. The settings/thresholds can be applicable year-round or for designated dates (or date period/group). Some of these settings (e.g., free time, blocked off times) can be automatically detected by, for example, the agent module 202 and stored to a corresponding agent or item database.

In some embodiments, a similar customer modification user interface (or "customer user interface") can be provided to a customer requesting a modification to an existing reservation. As such, the customer user interface includes a list of available alternative rental start times, end times, or both for a relevant start day and/or end day in the rental period. In some cases, a fee associated with each entry in the list of available alternative start times, end times, or both is included in the customer user interface. For example, as shown in FIG. 5, the time periods beginning at 7:00 AM, 8:00 AM, and 6:00 PM are shaded to indicate that the start time cannot be modified to those time periods, and the time periods beginning at 9:00 AM through 5:00 PM are available as alternative start times with a fee amount associated with each available time period. The customer user interface can also provide an option for modifying the rental end time (Check Out). In the example, the customer can end the rental for free until 1:00 PM and for a fee between 1:00 PM and 5:00 PM. The time period beginning at 6:00 PM and after are shaded to indicate that those times cannot be selected. Here, the customer can select an open box next to the time period the customer wants to change the check-in time and/or checkout time to.

In some embodiments, a link to the customer user interface can be transmitted from the agent to the customer via, for example, email or text message. For example, if the customer contacts (e.g., telephone call, email, text) the agent regarding how early they can check in or how late they can check out, the agent can respond with the link. In some embodiments, for example when the system is integrated into a website for an agent, the integrated website can include a button, linking text, or some other interactive component that connects the customer to the customer user interface.

Returning to FIG. 3, the evaluation component 304 periodically reevaluates the pricing success matrix to determine updated fees and revised modification options/recommendations. The frequency of the reevaluation is set by the agent (e.g., once a day, once a week, once a month). In a non-autopilot mode (e.g., the autopilot mode not being activated), the notification module 320 provides an alert to the agent regarding changes in the machine-learning modification recommendations. In some cases, the alerts are sent if the modification recommendations satisfy the minimum and/or maximum fee thresholds set by the agent. The alert can highlight current modification options and suggested revisions. For example, the alert can indicate that four hours early is currently set to $15 but recent data shows that $15 will no longer likely be successful but $10 will be. Once the agent receives the alert, the agent can approve the revised modification recommendation. Approval can cause the update engine 318 to update the modification options with the recommendation. In an alternative embodiment, the agent can manually update one or more fees. For example, the agent can access the agent user interface and adjust one or more fees based on the alert.

In some cases, if the fees are outside of the minimum or maximum thresholds set by the agent, an alert can be sent by the notification module 320 to provide the agent with the trending information. These alerts can be queued to be sent to the agent at a frequency set by the agent (e.g., real-time, daily digest, weekly digest). Based on these alerts, the agent can manually modify their modification options (e.g., fees).

In some embodiments, the agent can switch on an autopilot mode (e.g., via their settings). In the autopilot mode, all machine learning revised modification recommendations/options are automatically updated in real-time without review by the agent so long as the modifications are within the minimum/maximum thresholds set by the agent and the updates respect the free and/or not available times previously set by the agent. For example, assume the agent has set a minimum threshold for a fee of $10 for checking in two hours early and the current fee is set for $15. If the revised modification recommendation indicates that the fee should be set at $12 for check-in two hours early, this is above the minimum threshold (e.g., $10). As such, the update engine 318 will automatically update, in real-time and without agent input, the modification option shown to a customer to indicate the $12 fee for two-hour earlier check-in.

If the revised modification recommendation does not satisfy the minimum/maximum thresholds in an autopilot mode, then an alert is sent by the notification module 320 to the agent. In some cases, the alert is queued to be sent to the agent at a frequency set by the agent (e.g., real-time, daily digest, weekly digest).

Figure 6:
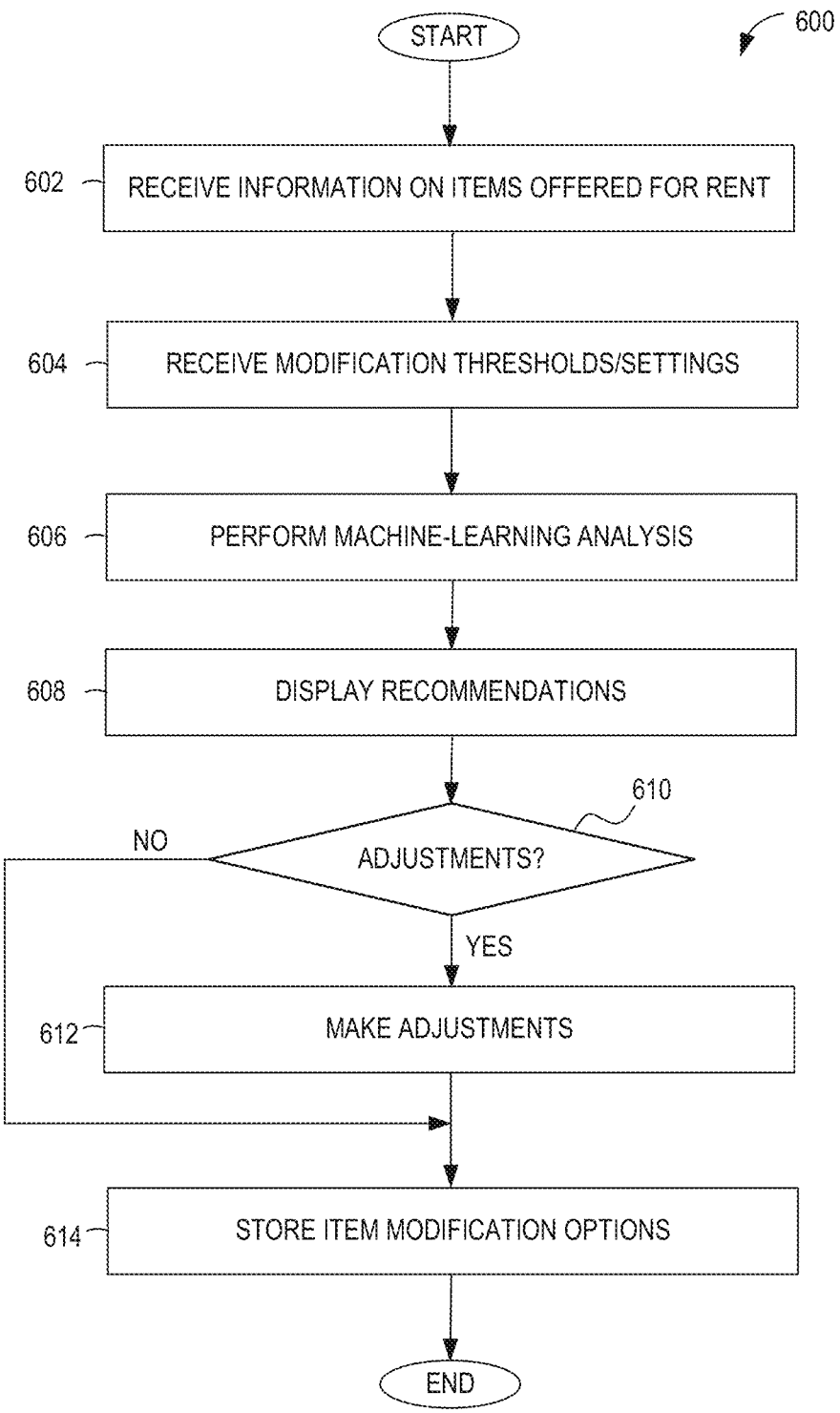
FIG. 6 is a flowchart illustrating operations of a method for generating item modification options, according to some example embodiments.

FIG. 6 is a flowchart illustrating operations of a method 600 for generating item modification options, according to some example embodiments. Operations in the method 600 may be performed by the network system 102 described above with respect to FIG. 1 to FIG. 3. Accordingly, the method 600 is described by way of example with reference to this component in the network system 102. However, it shall be appreciated that at least some of the operations of the method 600 may be deployed on various other hardware configurations or be performed by similar components residing elsewhere in the network environment 100. Therefore, the method 600 is not intended to be limited to this component.

In operation 602, the network system 102 receives information on items offered for rent from an agent. In example embodiments, the agent can create an account and provide information regarding their items via the agent module 202. In other embodiments, the item information can be accessed from the reservation system 124.

In operation 604, the network system 102 receives modification thresholds or settings. In example embodiments, the agent can provide inputs regarding options available for modification for each item. These options can include whether rental start datetime, rental end datetime, or both datetimes can be modified and when the modifications can occur (e.g., for all days of the year, for a specific day, or for a group of days). Additionally, the agent can set, via the agent module 202, a frequency at which the machine learning analysis is performed to update modification recommendations/options and a minimum threshold and/or a maximum threshold for one or more of the time periods, which can be used in an autopilot mode to automatically adjust a corresponding modification option (e.g., a fee charged for making the modification). The settings and thresholds can be for individual items or a set of items associated with the agent. Furthermore, the settings and thresholds can be applicable year-round or to specific dates or a group of dates (e.g., summer, Spring break).

In operation 606, the evaluation component 304 performs the machine-learning analysis in response to a request from the agent to generate modification options for an item. In example embodiments, the agent indicates an item of interest that the agent wants to establish modification options for via, for example, an agent user interface. The agent may indicate, for example, the item along with particular dates (or grouping of dates) that the modification options will apply to. In some embodiments, the agent may be presented a calendar interface on which the agent can select a span of days (e.g., time period) to edit. For example, the agent can select any desired span of dates for the purpose of setting a standard start/end time (e.g., for a year), a default start/end time (e.g., for specific days or group of days), or alternative start/end datetimes. In some embodiments, the agent can select an individual item or a plurality of items for datetime modification. For example, the calendar user interface can include an option for selecting one or more items associated with the agent's account. Alternatively, an additional user interface (or popup window) can be provided where the agent can identify, input, or select one or more items for generating modification options.

The attribute extractor 314 then accesses data associated with the agent and the item to extract item attributes and agent attributes (e.g., past adjustments the agent has accepted, minimum and maximum fee ranges for different time periods). Similarly, the attribute extractor 314 can access a listing data associated with the item and determine item attributes. For example, if the item is real estate, the item attributes can include cost of the rental per day, location, square footage, number of bedrooms, and/or number of bathrooms.

The analysis module 316 applies the extracted attributes to the modification probability model. In some embodiments, the analysis module 316 generates a customized pricing success matrix that is presented to the agent. The pricing success matrix indicates probabilities for a plurality of potential modification options. Once the agent approves of the pricing success matrix, the agent can, for example, select an "update recommendation" button/icon 402. The approval triggers the analysis module 316 to select the highest machine-learning-derived fee in a set of fees (e.g., fees with the highest percentage) that transgresses a fee threshold for each time period. In an alternative embodiment, the pricing success matrix may not be displayed to the agent and instead, the analysis module 316 simply identifies the highest machine-learning-derived fee for each time period.

In operation 608, the modification recommendations are displayed. In example embodiments, the update engine 318 receives the highest fees for each time period from the analysis module 316 and uses those fees to populate an agent user interface with modification recommendations. In some cases, the agent has set (e.g., via the agent module 202) the minimum and maximum thresholds they are willing to accept for different time periods and/or has set times that are not available for early/late check-in or late checkout (e.g., in operation 604). The update engine 310 accesses these settings and uses this information when populating the agent user interface.

In operation 610, a determination is made whether there are any adjustments to the recommendations. In example embodiments, the agent can override or adjust any of the recommendations (e.g., available/unavailable times) or parameters (e.g., fees) shown on the agent user interface 500. For example, the agent can block times that are not available causing them to be grayed out, mark time as free if there is no charge for that particular time, or adjust the fees.

If there are one or more adjustments, the adjustments are made to the modification options in operation 612. The modification options are then stored in operation 614.

Returning to operation 610, if there are no adjustments made to the recommendations, then the recommendations become the modification options for the item for the indicated dates. The modification options are then stored in operation 614.

Figure 7:
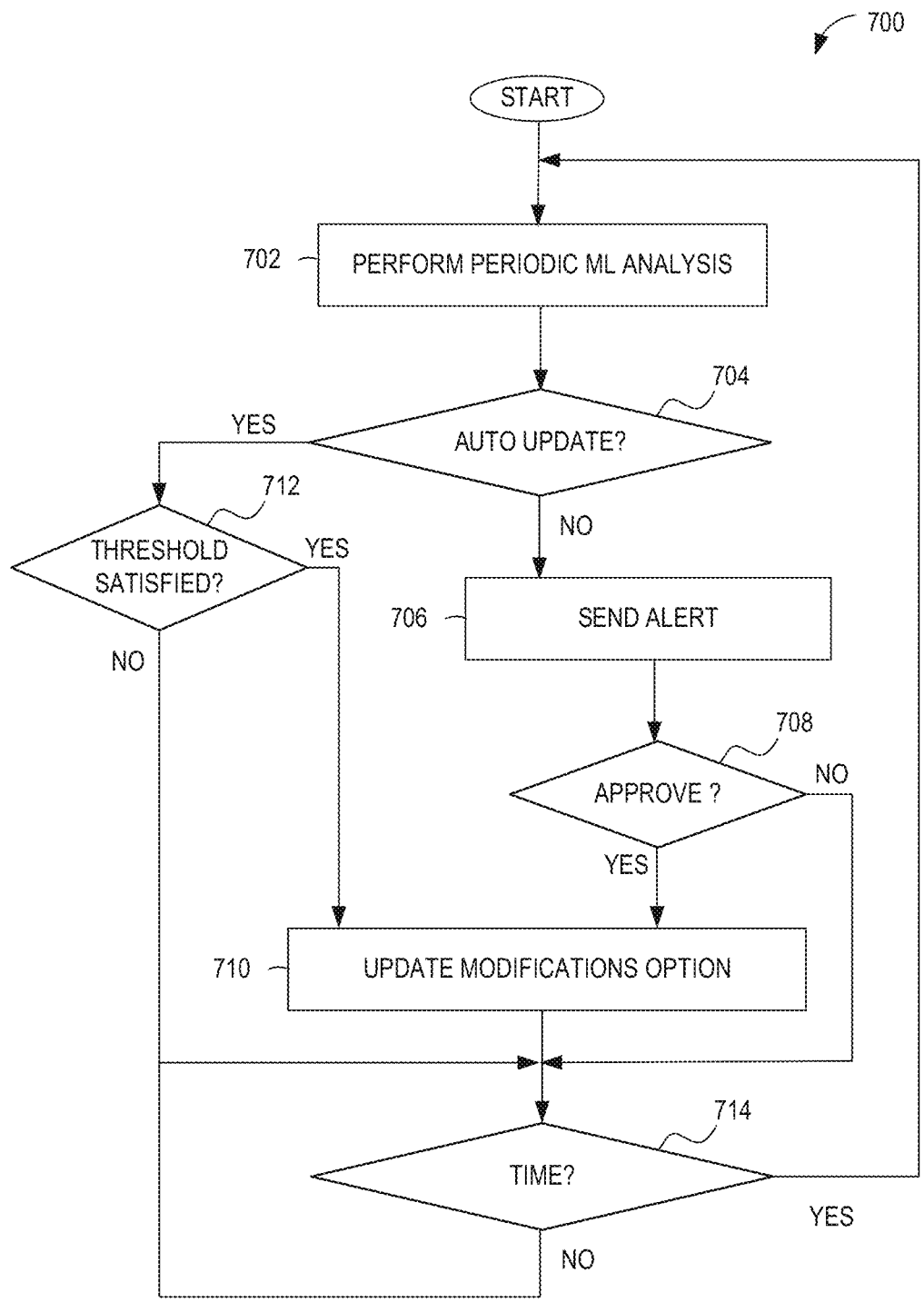
FIG. 7 is a flowchart illustrating operations of a method for periodically updating the item modification options, according to some example embodiments.

FIG. 7 is a flowchart illustrating operations of a method 700 for periodically updating the item modification parameters, according to some example embodiments, according to some example embodiments. Operations in the method 700 may be performed by the machine learning system 118 described above with respect to FIG. 3. Accordingly, the method 700 is described by way of example with reference to these components in the machine learning system 118. However, it shall be appreciated that at least some of the operations of the method 700 may be deployed on various other hardware configurations or be performed by similar components residing elsewhere in the network environment 100. Therefore, the method 700 is not intended to be limited to these components.

In operation 702, the evaluation component 304 performs periodic machine-learning analysis to determine updated fees and revised modification recommendations. The frequency of the reevaluation is set by the agent (e.g., once a day, once a week, once a month). In example embodiments, the periodic machine-learning analysis is performed with a retrained or updated (modification) probability model.

In operation 704, a determination is made whether the agent allows for automatic updates. In example embodiments, the update engine 318 checks if the agent has turned on an autopilot mode. If the agent has not turned on the autopilot mode, then an alert is sent to the agent in operation 706. In example embodiments, the notification module 320 provides the alert to the agent regarding changes in the machine-learning modification recommendations. The alert can highlight current modification options and suggested revisions.

In operation 708, a determination is made whether the changes indicated in the alert are approved. In embodiments where more than one modification option is recommended to be changed, the agent can approve one or more of the modification options. If approved, the approved modification option(s) are updated in operation 710. In example embodiments, approval causes the update engine 318 to update the fee(s) for the modification option with the recommended updated fee(s). In an alternative embodiment, the agent can manually update one or more fees based on the alert. For example, the agent can access the agent user interface and manually adjust one or more fees based on the alert.

Returning to operation 704, if the agent has turned on the autopilot mode, then in operation 712, a determination is made whether a corresponding threshold is satisfied. In the autopilot mode, all machine learning revised modification recommendations are used to automatically update the modification options in real-time without review by the agent so long as the modifications are within the minimum/maximum thresholds set by the agent and the updates respect the free and/or not available times previously set by the agent. If the threshold(s) are satisfied, then the modification option(s) are automatically updated in operation 710. In some cases, if the revised modification recommendation does not satisfy the minimum/maximum thresholds in an autopilot mode, then an alert can be sent by the notification module 320 to the agent.

If the modification recommendation is not approved in operation 708, the threshold is not satisfied in operation 712, or after the update is made to the modification option in operation 710, the method 700 continues to operation 714. In operation 714, the system checks if a reevaluation time (based on the agent-set frequency) has been reached. If the reevaluation time is reached, then the method 700 returns to operation 702 where the machine-learning analysis is performed. In example embodiments, the re-performing of the machine-learning analysis is done using a retrained or updated modification probability model. If the reevaluation time is not reached, then the method 700 periodically checks for the reevaluation time.

Figure 8:
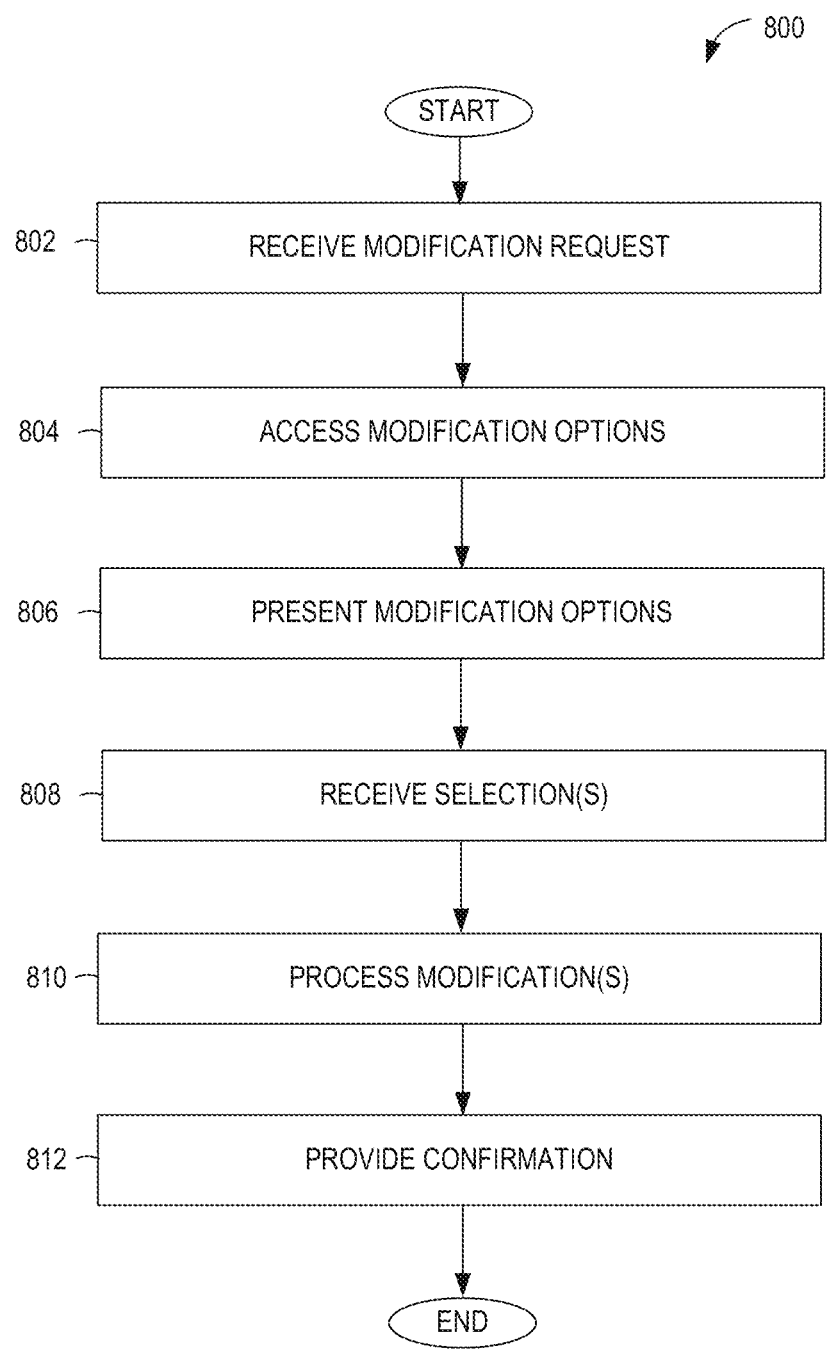
FIG. 8 is a flowchart illustrating operations of a method for modifying a reservation using the reservation modification system, according to some example embodiments.

FIG. 8 is a flowchart illustrating operations of a method 800 for modifying a reservation using the reservation modification system, according to some example embodiments, according to some example embodiments. Operations in the method 800 may be performed by the reservation modification system 116 described above with respect to FIG. 2. Accordingly, the method 800 is described by way of example with reference to these components in the reservation modification system 116. However, it shall be appreciated that at least some of the operations of the method 800 may be deployed on various other hardware configurations or be performed by similar components residing elsewhere in the network environment 100. Therefore, the method 800 is not intended to be limited to these components.

In operation 802, the modification engine 210 receives a modification request from the customer. The modification request can indicate the reservation number and/or dates of the reservation. In one embodiment, the customer may be shown a calendar view spanning several weeks as well as a search window for a particular start date and a particular end date. Other calendar views are contemplated, including yearly, monthly, and weekly views. The calendar view can indicate a period for the customer's existing reservation or a period of days for which they may want to modify (e.g., shaded on the calendar to indicate a rental period span). In alternative embodiments, the customer can enter in a text field the start date and/or end day to initiate a process for modifying one or more datetimes. In yet a further embodiment, the customer can provide their reservation number. In some embodiments, the customer can just indicate that they want to make a modification, and the network system 102 accesses reservation information for the customer from the reservation system 124 and identifies the reservation for modification.

In operation 804, the modification engine 210 accesses modification options for the item being rented in the reservation. Once the reservation is identified, the modification engine 210 accesses a data storage that stores the modification options for the particular item for the specific dates of the reservation.

In operation 806, the modification engine 210 presents the modification options in a customer user interface. The customer user interface includes a list of available alternative rental start times, end times, or both for a relevant start day and/or end day in the rental period of the reservation. In some cases, a fee associated with each entry in the list of available alternative start times, end times, or both is included in the customer user interface. The fee can be a monetary amount or be free. The customer user interface also includes a box next to each selectable option.

In operation 808, the modification engine 210 receives one (e.g., for just check-in, for just checkout) or two (e.g., for both check-in and checkout) selections from the customer. For example, the customer may select a box for an early check-in time and/or a box for a late checkout time.

In operation 810, the modification engine 210 processes the modification(s). If payment is needed, the modification engine 210 triggers payment processing. In cases where the payment processing is external to the network system 102, the communication module 206 is in communication with an external payment system to process a payment for a rental modification. Alternatively, if the network system 102 comprises a payment system, the internal payment system can process the payment.

In operation 812, the modification engine 210 provides a confirmation to the customer. The modification engine 210 also notifies the agent regarding the modified reservation.

Figure 9:
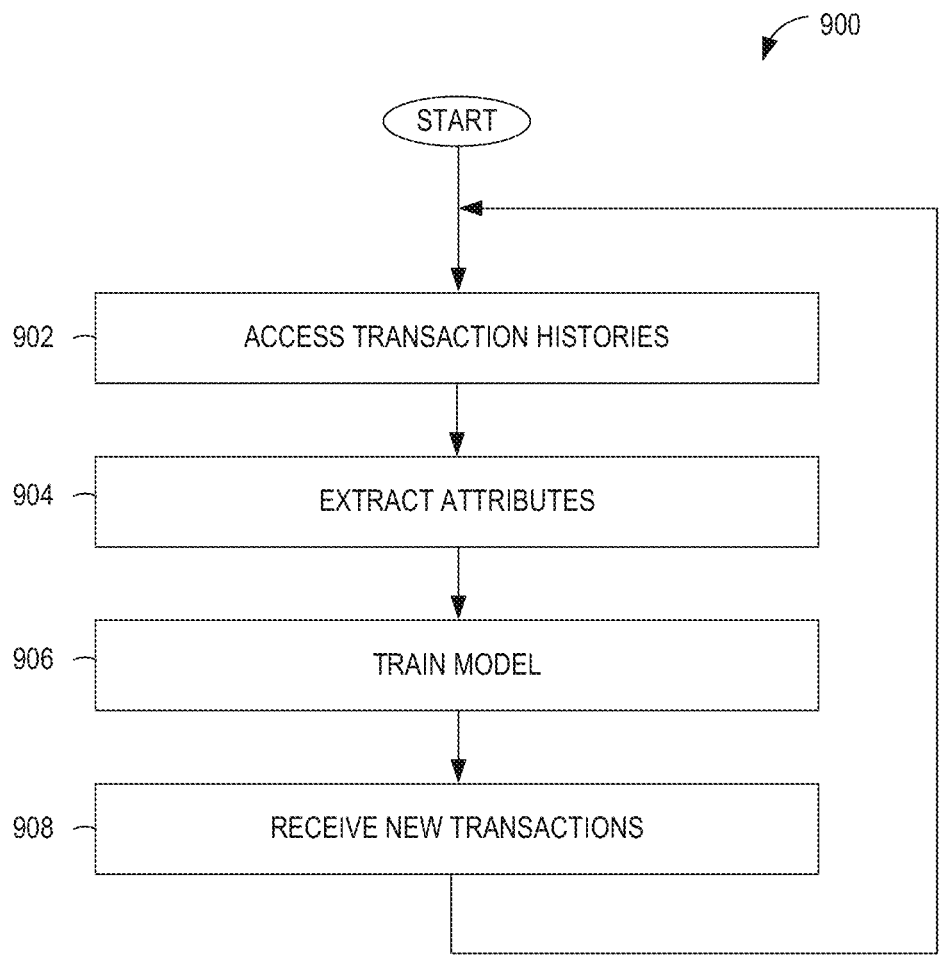
FIG. 9 is a flowchart illustrating operations of a method for training and updating the machine-learning modification probability model, according to some example embodiments.

FIG. 9 is a flowchart illustrating operations of an example method 900 for training and updating the machine-learning modification probability model. Operations in the method 900 may be performed by the machine learning system 118 (e.g., the training component 302), using components described above with respect to FIG. 3. Accordingly, the method 900 is described by way of example with reference to the machine learning system 118. However, it shall be appreciated that at least some of the operations of the method 900 may be deployed on various other hardware configurations or be performed by similar components residing elsewhere in the network environment 100. Therefore, the method 900 is not intended to be limited to the machine learning system 118.

In operation 902, the machine learning system 118 accesses past transactions facilitated by the reservation modification system 116. In some cases, the access module 306 accesses a data storage (e.g., data storage 122) that stores the transaction histories. The accessed past transactions can be for a particular time period (e.g., last 6 months) and/or for particular types of items.

In operation 904, the extractor 308 extracts training data from the past transactions. For example, the extractor 208 extracts item attributes (e.g., rental prices, location, square footage, number of bedrooms, number of bathrooms, number of people) and modification attributes (e.g., number of hours for early check-in, number of hours for late checkout, fee paid for early check-in and/or late checkout, previous price accepted/declined) along with accepted and rejected modification options.

In operation 906, the modification probability model is trained by the training module 310. The machine learning can occur using, for example, a neural network or classical machine learning. The training of the modification probability model may include training for probabilities (e.g., thresholds and/or ranges) of whether a user will accept a modification option based on a combination of time and cost. That is, the modification probability model is trained to predict a likelihood a user will accept a modification option.

In operation 908, new transactions are received as they are performed by the reservation modification system 116. The new transactions may be stored to the data storage and subsequently used to periodically retrain/refine the modification probability model. Thus, the method 900 returns to operation 902 and operations 902 to 908 of the method 900 are periodically repeated (e.g., hourly, daily, weekly). The retraining of the modification probability model provides for more accurate predictions and capturing of changing trends, thus improving the accuracy and performance of the network system 102. In some cases, the transactions histories used to retrain the modification probability model is for a rolling period of time (e.g., for the last 6 months or year).

Figure 10:
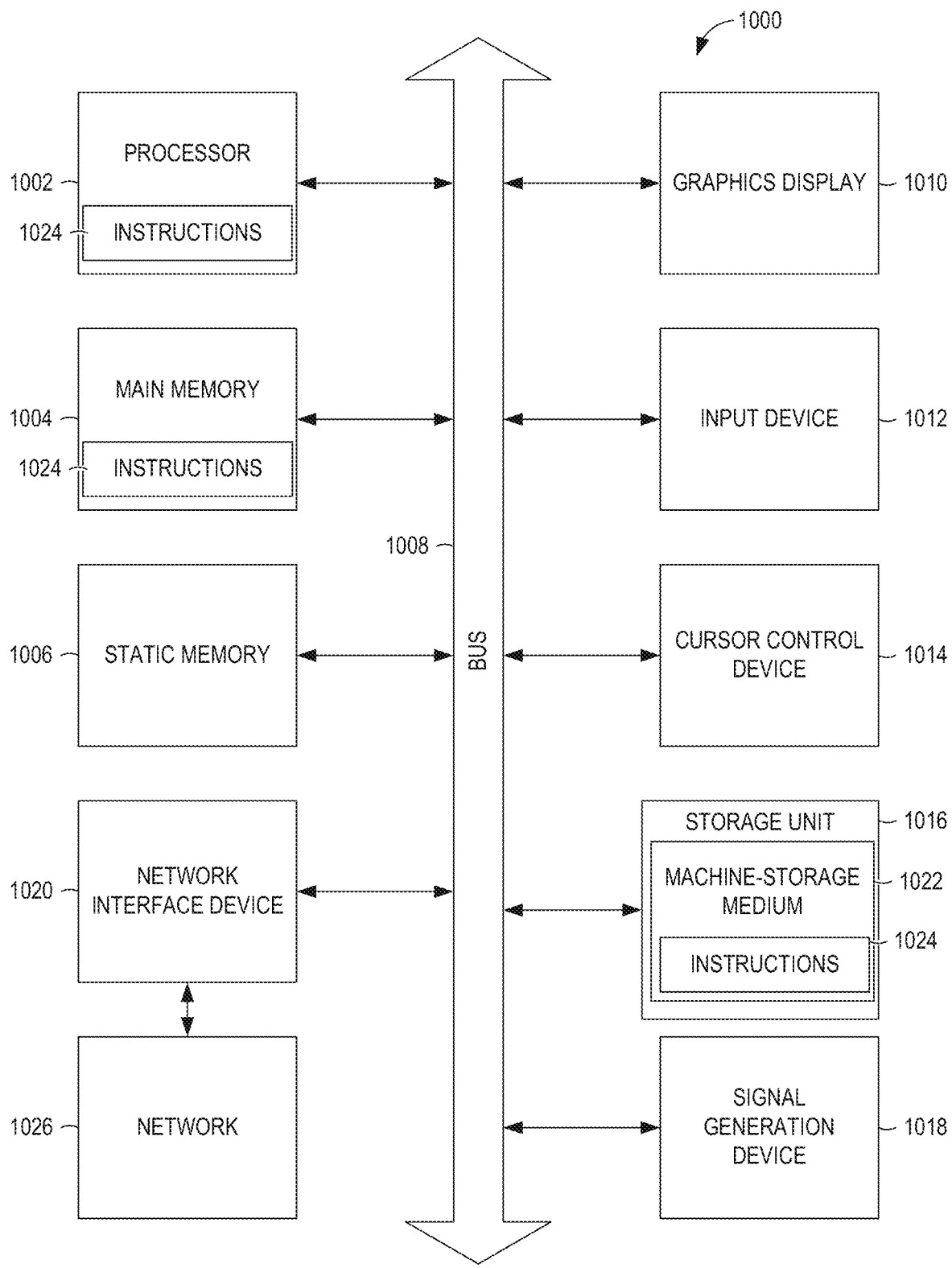
FIG. 10 is a block diagram illustrating components of a machine, according to some example embodiments, able to read instructions from a machine-storage medium and perform any one or more of the methodologies discussed herein.

FIG. 10 illustrates components of a machine 1000, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 10 shows a diagrammatic representation of the machine 1000 in the example form of a computer device (e.g., a computer) and within which instructions 1024 (e.g., software, a program, an application, an applet, an app, or other executable code) for causing the machine 1000 to perform any one or more of the methodologies discussed herein may be executed, in whole or in part.

For example, the instructions 1024 may cause the machine 1000 to execute the flow diagrams of FIG. 6 to FIG. 9. In one embodiment, the instructions 1024 can transform the machine 1000 into a particular machine (e.g., specially configured machine) programmed to carry out the described and illustrated functions in the manner described.

In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a peer-to-peer (or distributed) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024 (sequentially or otherwise) that specify actions to be taken by that machine. Further, while only a single machine is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a graphics display 1010 (e.g., a plasma display panel (PDP), a light emitting diode (LED) display, a liquid crystal display (LCD), a projector, or a cathode ray tube (CRT), or any other display capable of displaying graphics or video). The machine 1000 may also include an input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a sound card, an amplifier, a speaker, a headphone jack, or any suitable combination thereof), and a network interface device 1020.

The storage unit 1016 includes a machine-storage medium 1022 (e.g., a tangible machine-storage medium) on which is stored the instructions 1024 (e.g., software) embodying any one or more of the methodologies or functions described herein. The instructions 1024 may also reside, completely or at least partially, within the main memory 1004, within the processor 1002 (e.g., within the processor's cache memory), or both, before or during execution thereof by the machine 1000. Accordingly, the main memory 1004 and the processor 1002 may be considered as machine-storage media (e.g., tangible and non-transitory machine-storage media). The instructions 1024 may be transmitted or received over a network 1026 via the network interface device 1020.

In some example embodiments, the machine 1000 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (e.g., 1004, 1006, and/or memory of the processor(s) 1002) and/or storage unit 1016 may store one or more sets of instructions and data structures (e.g., software) 1024 embodying or utilized by any one or more of the methodologies or functions described herein. These instructions, when executed by processor(s) 1002 cause various operations to implement the disclosed embodiments.

As used herein, the terms "machine-storage medium," "device-storage medium," "computer-storage medium" (referred to collectively as "machine-storage medium 1022") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1022 include non-volatile memory, including by way of example semiconductor memory devices, for example, erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 1022 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1024 may further be transmitted or received over a communications network 1026 using a transmission medium via the network interface device 1020 and utilizing any one of a number of well-known transfer protocols (e.g., HTTP). Examples of communication networks 1026 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 1024 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for managing reservation modifications using machine-learning analysis. The method comprises training a modification probability model with training data extracted from past modification transactions, the modification probability model configured to determine probabilities for modification option acceptance; receiving a request, from an agent of an item, to generate modification options for the item; based on the request from the agent, performing machine learning analysis by applying attributes associated with the item to the modification probability model to generate modification recommendations; establishing the modification options for the item based on the modification recommendations; receiving, from a customer of the agent, a request to modify a rental reservation for the item; in response to the request from the customer, accessing the modification options for the item and based on the modification options, causing presentation, on a device of the customer, of a modification user interface, the modification user interface including blocked off time periods that cannot be selected for modification and available time periods available as alternative start times or end times for the rental reservation, the modification user interface further including a fee associated with each available time period; receiving, via the modification user interface, a selection of an alternative start time or end time; processing the selection of the alternative start time or end time; and in response to the processing, transmitting a confirmation to the customer confirming modification of the rental reservation.

In example 2, the subject matter of example 1 can optionally include accessing updated modification transactions; extracting training data from the updated modification transactions; and retraining the modification probability model.

In example 3, the subject matter of any of examples 1-2 can optionally include wherein the performing machine learning analysis generates a pricing success matrix for alternative check-in or alternative checkout, the pricing success matrix indicating the probabilities for modification option acceptance for a plurality of potential modification options.

In example 4, the subject matter of any of examples 1-3 can optionally include wherein the performing machine learning analysis further comprises selecting a potential modification option with a highest fee that transgresses a fee threshold for each time period as a modification recommendation.

In example 5, the subject matter of any of examples 1-4 can optionally include wherein the performing machine learning analysis further comprises determining the modification recommendations based on results from the applying the attributes associated with the item to the modification probability model; and causing presentation, on a device of the agent, of an agent user interface with the modification recommendations, the agent user interface including recommended available time periods as alternative start times or end times for the item and a corresponding recommended fee associated with each recommended available time period, wherein the establishing the modification options for the item based on the modification recommendations is in response to an approval indication received via the agent user interface.

In example 6, the subject matter of any of examples 1-5 can optionally include prior to receiving the approval indication, receiving one or more adjustments to the modification recommendation, the one or more adjustments including a change in a fee or a change to an available time period.

In example 7, the subject matter of any of examples 1-6 can optionally include at a predetermined reevaluation frequency, re-performing the machine learning analysis by applying the attributes associated with the item to a retrained modification probability model to generate revised modification recommendations.

In example 8, the subject matter of any of examples 1-7 can optionally include, in response to an autopilot mode being activated, automatically updating, in real-time and without input from the agent, one or more modification options based on the revised modification recommendations being within one or more minimum or maximum thresholds set by the agent.

In example 9, the subject matter of any of examples 1-8 can optionally include, in response to an autopilot mode not being activated, generating and transmitting an alert to the agent regarding the revised modification recommendations, the alert indicating suggested revisions based on the revised modification recommendation.

In example 10, the subject matter of any of examples 1-9 can optionally include receiving, from the agent, modification thresholds and settings including a reevaluation frequency for re-performing the machine learning analysis and a minimum threshold or a maximum threshold for one or more of the available time periods associated with the item.

Example 11 is a system for managing reservation modifications using machine-learning analysis. The system comprises one or more hardware processors and a memory storing instructions that, when executed by the one or more hardware processors, cause the one or more hardware processors to perform operations comprising training a modification probability model with training data extracted from past modification transactions, the modification probability model configured to determine probabilities for modification option acceptance; receiving a request, from an agent of an item, to generate modification options for the item; based on the request from the agent, performing machine learning analysis by applying attributes associated with the item to the modification probability model to generate modification recommendations; establishing the modification options for the item based on the modification recommendations; receiving, from a customer of the agent, a request to modify a rental reservation for the item; in response to the request from the customer accessing the modification options for the item, and based on the modification options, causing presentation, on a device of the customer, of a modification user interface, the modification user interface including blocked off time periods that cannot be selected for modification and available time periods available as alternative start times or end times for the rental reservation, the modification user interface further including a fee associated with each available time period; receiving, via the modification user interface, a selection of an alternative start time or end time; processing the selection of the alternative start time or end time; and in response to the processing, transmitting a confirmation to the customer confirming modification of the rental reservation.

In example 12, the subject matter of example 11 can optionally include wherein the operations further comprise accessing updated modification transactions; extracting training data from the updated modification transactions; and retraining the modification probability model.

In example 13, the subject matter of any of examples 11-12 can optionally include wherein the performing machine learning analysis generates a pricing success matrix for alternative check-in or alternative checkout, the pricing success matrix indicating the probabilities for modification option acceptance for a plurality of potential modification options.

In example 14, the subject matter of any of examples 11-13 can optionally include wherein the performing machine learning analysis further comprises selecting a potential modification option with a highest fee that transgresses a fee threshold for each time period as a modification recommendation.

In example 15, the subject matter of any of examples 11-14 can optionally include wherein the performing machine learning analysis further comprises determining the modification recommendations based on results from the applying the attributes associated with the item to the modification probability model; and causing presentation, on a device of the agent, of an agent user interface with the modification recommendations, the agent user interface including recommended available time periods as alternative start times or end times for the item and a corresponding recommended fee associated with each recommended available time period, wherein the establishing the modification options for the item based on the modification recommendations is in response to an approval indication received via the agent user interface.

In example 16, the subject matter of any of examples 11-15 can optionally include wherein the operations further comprise prior to receiving the approval indication, receiving one or more adjustments to the modification recommendation, the one or more adjustments including a change in a fee or a change to an available time period.

In example 17, the subject matter of any of examples 11-16 can optionally include wherein the operations further comprise at a predetermined reevaluation frequency, re-performing the machine learning analysis by applying the attributes associated with the item to a retrained modification probability model to generate revised modification recommendations.

In example 18, the subject matter of any of examples 11-17 can optionally include wherein the operations further comprise in response to an autopilot mode being activated, automatically updating, in real-time and without input from the agent, one or more modification options based on the revised modification recommendations being within one or more minimum or maximum thresholds set by the agent.

In example 19, the subject matter of any of examples 11-18 can optionally include wherein the operations further comprise in response to an autopilot mode not being activated, generating and transmitting an alert to the agent regarding the revised modification recommendations, the alert indicating suggested revisions based on the revised modification recommendation.

Example 20 is a storage medium comprising instructions which, when executed by one or more hardware processors of a machine, cause the machine to perform operations for managing reservation modifications using machine-learning analysis. The operations comprise training a modification probability model with training data extracted from past modification transactions, the modification probability model configured to determine probabilities for modification option acceptance; receiving a request, from an agent of an item, to generate modification options for the item; based on the request from the agent, performing machine learning analysis by applying attributes associated with the item to the modification probability model to generate modification recommendations; establishing the modification options for the item based on the modification recommendations; receiving, from a customer of the agent, a request to modify a rental reservation for the item; in response to the request from the customer accessing the modification options for the item, and based on the modification options, causing presentation, on a device of the customer, of a modification user interface, the modification user interface including blocked off time periods that cannot be selected for modification and available time periods available as alternative start times or end times for the rental reservation, the modification user interface further including a fee associated with each available time period; receiving, via the modification user interface, a selection of an alternative start time or end time; processing the selection of the alternative start time or end time; and in response to the processing, transmitting a confirmation to the customer confirming modification of the rental reservation.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   training, by a training component of a machine learning system, a modification probability model with training data extracted from past modification transactions, the training data including item attributes of items being rented and modification attributes including acceptance and declines of previous modification options, the modification probability model configured to determine probabilities for modification option acceptance;
   receiving, via an agent user interface generated by a display module, a request, from an agent of an item, to generate modification options for the item;
   based on the request from the agent, triggering an evaluation component of machine learning system to perform machine learning analysis, the performing machine learning analysis comprising:
      extracting item attributes from listing data associated with the item and applying the extracted item attributes to the modification probability model to generate a success matrix comprising conversion probabilities that is used to derive modification recommendations;
      generating and causing display, on a device of the agent, of a user interface presenting the success matrix, the success matrix comprising a schema representing the conversion probabilities in matrix form and statistical confidence intervals for each item attribute, a high confidence interval indicating a large amount of historical data with fairly low variability resulting in higher trustworthiness of the corresponding conversion probabilities;

detecting that a modification of a value corresponding to one or more of the item attributes is made via the user interface that adjusts the trustworthiness of the corresponding conversion probabilities;

in response to receiving the modification, triggering the evaluation component to generate an updated success matrix comprising one or more modified confidence intervals based on the modification; and receiving a selection of an approval icon displayed on the user interface that indicates approval of the updated success matrix;

in response to receiving the selection of the approval icon, deriving the modification options for the item based on the modification recommendations and storing the modification options in a data storage;

receiving, by a modification engine from a customer of the agent, a request to modify a rental reservation for the item;

in response to receiving the request:
accessing the modification options for the item from the data storage;

triggering, by the modification engine, the display module to generate a customer modification user interface based on the modification options; and causing presentation, on a device of the customer, of the customer modification user interface, the customer modification user interface displaying a list of time periods including blocked off time periods that cannot be selected for modification and available time periods available as alternative start times or end times for the rental reservation, the modification user interface further displaying a fee and a selectable option associated with each available time period;

receiving, by the modification engine via the modification user interface, a selection of an alternative start time or end time;

triggering, by the modification engine, processing the selection of the alternative start time or end time; and in response to the processing, generating and transmitting, by the modification engine, a confirmation to the customer confirming modification of the rental reservation.

2. The method of claim 1, further comprising:
accessing updated modification transactions;
extracting training data from the updated modification transactions; and
retraining the modification probability model.

3. The method of claim 1, wherein the performing machine learning analysis further comprises:
selecting, from the pricing success matrix, a potential modification option with a highest fee that transgresses a fee threshold for each time period as a modification recommendation.

4. The method of claim 1, wherein the performing machine learning analysis further comprises:
determining the modification recommendations based on results from the applying the item attributes to the modification probability model; and
causing presentation, on a device of the agent, of an agent user interface with the modification recommendations, the agent user interface including recommended available time periods as alternative start times or end times for the item and a corresponding recommended fee associated with each recommended available time period, wherein the deriving the modification options for the item based on the modification recommendations is in response to an approval indication received via the agent user interface.

5. The method of claim 4, further comprising:
prior to receiving the approval indication, receiving one or more adjustments to the modification recommendation, the one or more adjustments including a change in a fee or a change to an available time period.

6. The method of claim 1, further comprising:
at a predetermined reevaluation frequency, automatically triggering the evaluation component to re-performing the machine learning analysis by applying the attributes associated with the item to a retrained modification probability model to regenerate the success matrix and derive revised modification recommendations.

7. The method of claim 6, further comprising:
in response to an autopilot mode being activated, triggering an update engine to automatically update, in real-time and without input from the agent, one or more modification options based on the revised modification recommendations being within one or more minimum or maximum thresholds set by the agent.

8. The method of claim 6, further comprising:
in response to an autopilot mode not being activated, generating and transmitting an alert to the agent regarding the revised modification recommendations, the alert indicating suggested revisions based on the revised modification recommendation.

9. The method of claim 1, further comprising:
receiving, from the agent, modification thresholds and settings including a reevaluation frequency for re-performing the machine learning analysis and a minimum threshold or a maximum threshold for one or more of the available time periods associated with the item.

10. A system comprising:
one or more hardware processors; and
a memory storing instructions that, when executed by the one or more hardware processors, cause the one or more hardware processors to perform operations comprising:
training, by a training component of a machine learning system, a modification probability model with training data extracted from past modification transactions, the training data including item attributes of items being rented and modification attributes including acceptance and declines of previous modification options, the modification probability model configured to determine probabilities for modification option acceptance;

receiving, via an agent user interface generated by a display module, a request, from an agent of an item, to generate modification options for the item;

based on the request from the agent, triggering an evaluation component of machine learning system to perform machine learning analysis, the performing machine learning analysis comprising:
extracting item attributes from listing data associated with the item and applying the extracted item attributes to the modification probability model to generate a success matrix comprising conversion probabilities that is used to derive modification recommendations;

generating and causing display, on a device of the agent, of a user interface presenting the success matrix, the success matrix comprising a schema representing the conversion probabilities in matrix form and statistical confidence intervals for each item attribute, a high confidence interval indicating a large amount of historical data with fairly low variability resulting in higher trustworthiness of the corresponding conversion probabilities;

detecting that a modification of a value corresponding to one or more of the item attributes is made via the user interface that adjusts the trustworthiness of the corresponding conversion probabilities;

in response to receiving the modification, triggering the evaluation component to generate an updated success matrix comprising one or more modified confidence intervals based on the modification; and receiving a selection of an approval icon displayed on the user interface that indicates approval of the updated success matrix;

in response to receiving the selection of the approval icon, deriving the modification options for the item based on the modification recommendations and storing the modification options in a data storage;

receiving, by a modification engine from a customer of the agent, a request to modify a rental reservation for the item;

in response to receiving the request:
accessing the modification options for the item from the data storage;

triggering, by the modification engine, the display module to generate a customer modification user interface based on the modification options; and causing presentation, on a device of the customer, of the customer modification user interface, the customer modification user interface displaying a list of time periods including blocked off time periods that cannot be selected for modification and available time periods available as alternative start times or end times for the rental reservation, the modification user interface further displaying a fee and a selectable option associated with each available time period;

receiving, by the modification engine via the modification user interface, a selection of an alternative start time or end time;

triggering, by the modification engine, processing the selection of the alternative start time or end time; and in response to the processing, generating and transmitting, by the modification engine, a confirmation to the customer confirming modification of the rental reservation.

11. The system of claim 10, wherein the operations further comprise:
accessing updated modification transactions;
extracting training data from the updated modification transactions; and
retraining the modification probability model.

12. The system of claim 10, wherein the performing machine learning analysis further comprises:
selecting, from the pricing success matrix, a potential modification option with a highest fee that transgresses a fee threshold for each time period as a modification recommendation.

13. The system of claim 10, wherein the performing machine learning analysis further comprises:

determining the modification recommendations based on results from the applying the item attributes to the modification probability model; and causing presentation, on a device of the agent, of an agent user interface with the modification recommendations, the agent user interface including recommended available time periods as alternative start times or end times for the item and a corresponding recommended fee associated with each recommended available time period, wherein the deriving the modification options for the item based on the modification recommendations is in response to an approval indication received via the agent user interface.

14. The system of claim 13, wherein the operations further comprise:
prior to receiving the approval indication, receiving one or more adjustments to the modification recommendation, the one or more adjustments including a change in a fee or a change to an available time period.

15. The system of claim 10, wherein the operations further comprise:
at a predetermined reevaluation frequency, automatically triggering the evaluation component to re-performing the machine learning analysis by applying the attributes associated with the item to a retrained modification probability model to regenerate the success matrix and derive revised modification recommendations.

16. The system of claim 15, wherein the operations further comprise:
in response to an autopilot mode being activated, triggering an update engine to automatically update, in real-time and without input from the agent, one or more modification options based on the revised modification recommendations being within one or more minimum or maximum thresholds set by the agent; or
in response to an autopilot mode not being activated, generating and transmitting an alert to the agent regarding the revised modification recommendations, the alert indicating suggested revisions based on the revised modification recommendation.

17. A machine-storage medium comprising instructions which, when executed by one or more hardware processors of a machine, cause the machine to perform operations comprising:
training, by a training component of a machine learning system, a modification probability model with training data extracted from past modification transactions, the training data including item attributes of items being rented and modification attributes including acceptance and declines of previous modification options, the modification probability model configured to determine probabilities for modification option acceptance;

receiving, via an agent user interface generated by a display module, a request, from an agent of an item, to generate modification options for the item;

based on the request from the agent, performing, by an evaluation component of the machine learning system, machine learning analysis, the performing machine learning analysis comprising:
extracting item attributes from listing data associated with the item and applying the extracted item attributes to the modification probability model to generate a success matrix comprising conversion probabilities that is used to derive modification recommendations;

generating and causing display, on a device of the agent, of a user interface presenting the success matrix, the success matrix comprising a schema representing the conversion probabilities in matrix form and statistical confidence intervals for each item attribute, a high confidence interval indicating a large amount of historical data with fairly low variability resulting in higher trustworthiness of the corresponding conversion probabilities;

detecting that a modification of a value corresponding to one or more of the item attributes is made via the user interface that adjusts the trustworthiness of the corresponding conversion probabilities;

in response to receiving the modification, triggering the evaluation component to generate an updated success matrix comprising one or more modified confidence intervals based on the modification; and receiving a selection of an approval icon displayed on the user interface that indicates approval of the updated success matrix;

in response to receiving the selection of the approval icon, deriving the modification options for the item based on the modification recommendations and storing the modification options in a data storage;

receiving, by a modification engine from a customer of the agent, a request to modify a rental reservation for the item;

in response to receiving the request:
  accessing the modification options for the item from the data storage;
  triggering, by the modification engine, the display module to generate a customer modification user interface based on the modification options; and
  causing presentation, on a device of the customer, of the customer modification user interface, the customer modification user interface displaying a list of time periods including blocked off time periods that cannot be selected for modification and available time periods available as alternative start times or end times for the rental reservation, the modification user interface further displaying a fee and a selectable option associated with each available time period;

receiving, by the modification engine via the modification user interface, a selection of an alternative start time or end time;

triggering, by the modification engine, processing of the selection of the alternative start time or end time; and in response to the processing, generating and transmitting, by the modification engine, a confirmation to the customer confirming modification of the rental reservation.

18. The method of claim 1, wherein the training and retraining of the modification probability model comprises:

grouping the past modification transactions based on one or more of categories, locations, pricing, or time frames;

selecting one or more groups of past modification transactions for training or retraining the modification probability model; and extracting the training data from the selected one or more groups of past modification transactions, wherein the training or retraining is based on the training data for the selected one or more groups of past modification.

\* \* \* \* \*